United States Patent [19]

Kim

[11] Patent Number: 5,607,129
[45] Date of Patent: Mar. 4, 1997

[54] GARMENT BAG LUGGAGE CART

[75] Inventor: Young S. Kim, Cupertino, Calif.

[73] Assignee: Inno Design, Inc., Palo Alto, Calif.

[21] Appl. No.: 212,002

[22] Filed: Mar. 11, 1994

(Under 37 CFR 1.47)

Related U.S. Application Data

[63] Continuation-in-part of Ser. No. 890,717, May 29, 1992, Pat. No. 5,330,141, and a continuation-in-part of Ser. No. 41,769, Apr. 2, 1993, abandoned.

[51] Int. Cl.⁶ .................................................. A63B 55/08
[52] U.S. Cl. ........................... 248/98; 190/18 A; 190/122; 206/287.1; 280/651
[58] Field of Search ................................ 248/98; 280/35, 280/37, 47.34, 79.7, 651; 190/18 A, 24, 122, 124, 127; 206/287.1

[56] References Cited

U.S. PATENT DOCUMENTS

| | | | |
|---|---|---|---|
| D. 192,700 | 5/1962 | O'Connor | 182/181 |
| 1,043,038 | 10/1912 | Alexander | 280/35 |
| 1,937,668 | 12/1933 | Pine | |
| 2,459,865 | 1/1949 | Bourne | |
| 2,465,847 | 3/1949 | Coffey | |
| 2,847,227 | 8/1958 | Lankford | 278/98 X |
| 3,329,442 | 7/1967 | Vietri | 280/35 |
| 3,836,144 | 9/1974 | Mahoney | |
| 3,841,650 | 10/1974 | Miskelly | 280/37 |
| 3,871,676 | 3/1975 | Renard et al. | 280/35 |
| 3,923,318 | 12/1975 | Renard et al. | 280/35 |
| 4,262,780 | 4/1981 | Samuelian | 280/47.34 X |
| 4,411,344 | 10/1983 | Walker | 190/18 A |
| 4,705,247 | 11/1987 | Delmerico | |
| 4,878,682 | 11/1989 | Lee | 280/651 X |
| 4,886,233 | 12/1989 | Bateman et al. | |
| 5,242,189 | 9/1993 | Osaki | 280/655 |
| 5,330,141 | 7/1994 | Kim | |
| 5,353,900 | 10/1994 | Stilley | 280/37 X |

FOREIGN PATENT DOCUMENTS 115905  5/1918  United Kingdom ..................... 280/35

*Primary Examiner*—Korie Chan
*Attorney, Agent, or Firm*—Douglas A. Chaikin, Esq.

[57] ABSTRACT

A luggage cart (10) is formed from two mirror image frame members (12) and (14), which are pivotally connected at (16) and (18). A soft shell fabric garment bag (20) is fastened to the frame members (12) and (14). Projections (24) extend into fold (26) of the garment bag (20) to support it in place on the frame members (12) and (14). A crossed flexible cable (42) is connected to the frame members (12) and (14) at (46) and (48) near the bottom of the frame members (12) and (14) by means of D-rings (49) and by means of tubes (51) near the top of the frame members (12) and (14) at front (50) and back (52) of the luggage cart (10). The cable 42 further is connected to a shoulder strap (56). In use of the luggage cart (10) and garment bag (20), the luggage cart (10) is opened by placing the luggage cart (10) on the ground and pressing down on the top of the garment bag (20) or on handles (40). The luggage cart can then be wheeled around by pulling on handle (58). To collapse the luggage cart (10), the user pulls up on the shoulder strap (56), which causes the cables (42) to move the frame members (12) and (14) toward one another at their bottom, making the frame members (12) and (14) substantially parallel to one another. The garment bag (20) and luggage cart (10) are then in a suitable configuration to be carried, either by the shoulder strap (56) or the handles (40).

3 Claims, 8 Drawing Sheets

GARMENT BAG LUGGAGE CART

This application is a continuation-in-part of my pending U.S. patent applications Ser. No. 07/890,717, filed May 29, 1992, now U.S. Pat. No. 5,330,141, and Ser. No. 08/041,769, filed Apr. 2, 1993, now abandoned, both entitled "Garment Bag Luggage Cart Attachment."

BACKGROUND OF THE INVENTION

1. Field of the Invention

The present invention relates generally to a garment bag and luggage cart combination. More particularly, it relates to a garment bag including a luggage cart that can be used to pull the garment bag on wheels in a configuration which is not prone to tipping, which permits the garment bag luggage cart combination to be changed in configuration easily for carrying with a shoulder strap or for pulling behind the user, and which allows the garment bag to be hung in a conventional manner.

2. Description of the Prior Art

As pointed out in the above copending applications, folding, wheeled carts are known for holding conventional suitcases, so that they can be pulled behind the user. Some suitcases also come with built-in wheels and a strap so that they can be pulled behind the user without a separate cart. Additional prior art is of record in the first of the above applications.

It is also known to provide a garment bag with a set of wheels that can be used to pull the garment bag along behind the user when the garment bag is folded in half, with the two halves in side by side relationship. However, such wheeled garment bags are unstable and tend to tip over when pulled behind the user in this configuration. As a result, they have achieved only limited consumer acceptance.

SUMMARY OF THE INVENTION

The above applications disclose attachments to conventional garment bags to provide the functionality of a luggage can with them. Those attachments provide an A-frame configuration for the garment bag on the attachments to provide stability for the combination when it is pulled along behind a user. Specific configurations for the attachments as disclosed are provided to accommodate preexisting garment bags.

It would also be highly desirable to provide the function of an A-frame luggage cart built with a new garment bag. It is, of course, possible to utilize the designs as disclosed as a basis for integrating them in a garment bag rather than as an attachment to be fastened to an existing garment bag. However, with the objective of providing the functionality of a luggage can integrated with a garment bag particularly designed to go with the luggage cart, the specific design may well take a different form.

In the use of such a garment bag having the functionality of an A-frame configuration luggage cart, it is important that the garment bag have the capability of being easily changed by the user to the conventional folded in half configuration for carrying with a shoulder strap and to the fully opened configuration for hanging in a closet, such as in a hotel room or in a hanging luggage compartment of an airplane cabin.

Accordingly, it is an object of this invention to provide an improved form of a garment bag including the function of a luggage cart.

It is a further object of the invention to provide such a garment bag incorporating the function of an A-frame shaped luggage cart in which structural members for providing the luggage cart function are integrated with a garment bag that is designed to receive them.

It is another object of the invention to provide a luggage cart and garment bag combination which easily changes shape between a luggage cart configuration and a form for carrying in a conventional manner as a garment bag.

It is still another object of the invention to provide such a luggage cart and garment bag combination with the further ability to change shape easily to a fully opened configuration for hanging.

It is a still further object of the invention to provide such a luggage cart and garment bag combination in which the above easy ability to change configuration can be provided in an integral construction with the garment bag, as an attachment for use with preexisting garment bags, or as an attachment for a garment bag that is specifically designed to be used with the attachment.

The attainment of these and related objects may be achieved through use of the novel garment bag luggage cart combination herein disclosed. A garment bag luggage cart combination in accordance with this invention has first and second pivotally connected frame members. The garment bag has first and second sides each attached to one of the pivotally connected frame members. Crossed cable members have ends each attached to one of said first and second frame members. A means pulls on the crossed cable members for moving the first and second sides of the garment bag from a spaced apart position toward each other.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
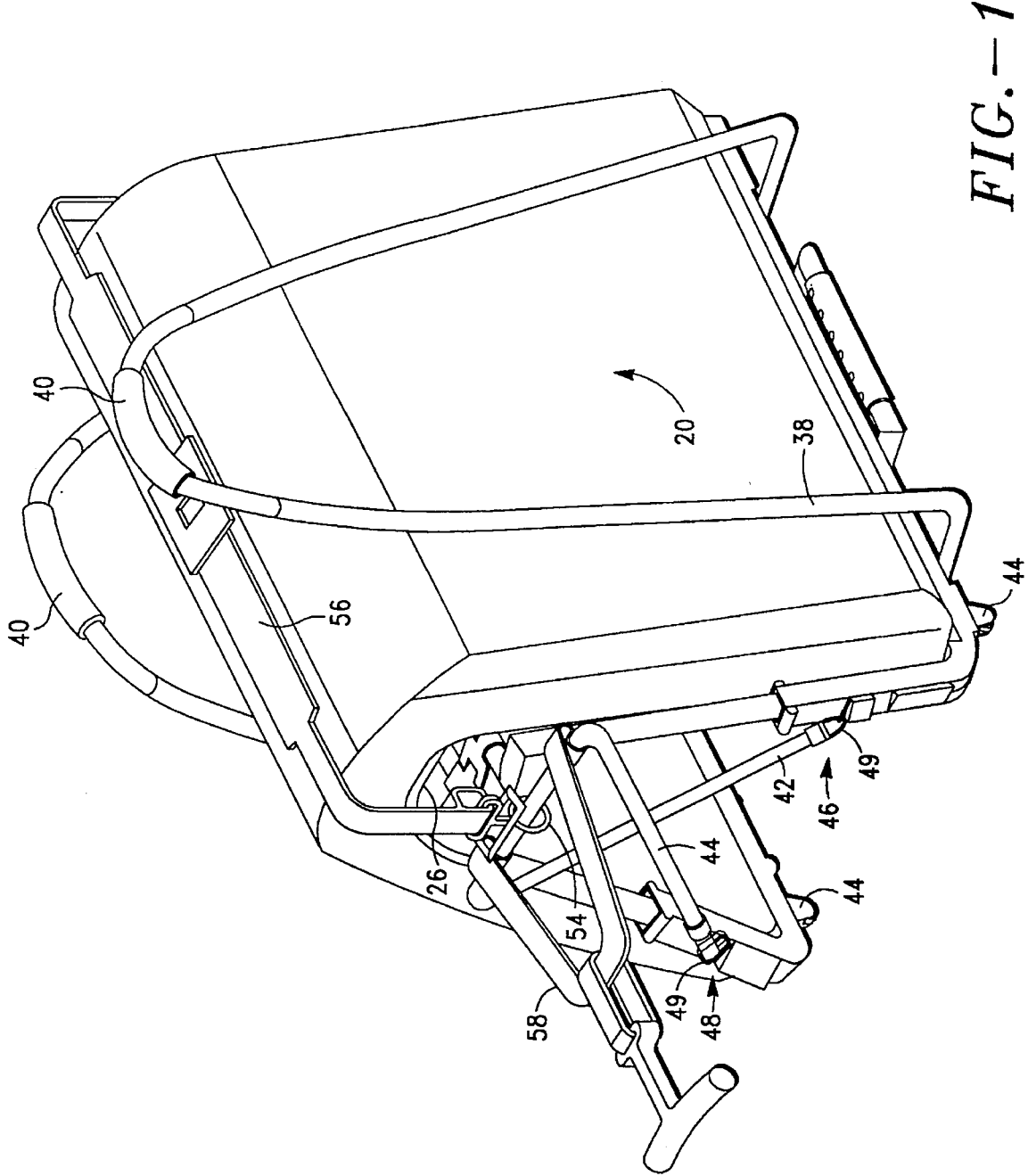
FIG. 1 is a perspective view of a garment bag luggage cart attachment combination in accordance with the invention in its standing configuration for use as a luggage cart.
Figure 2:
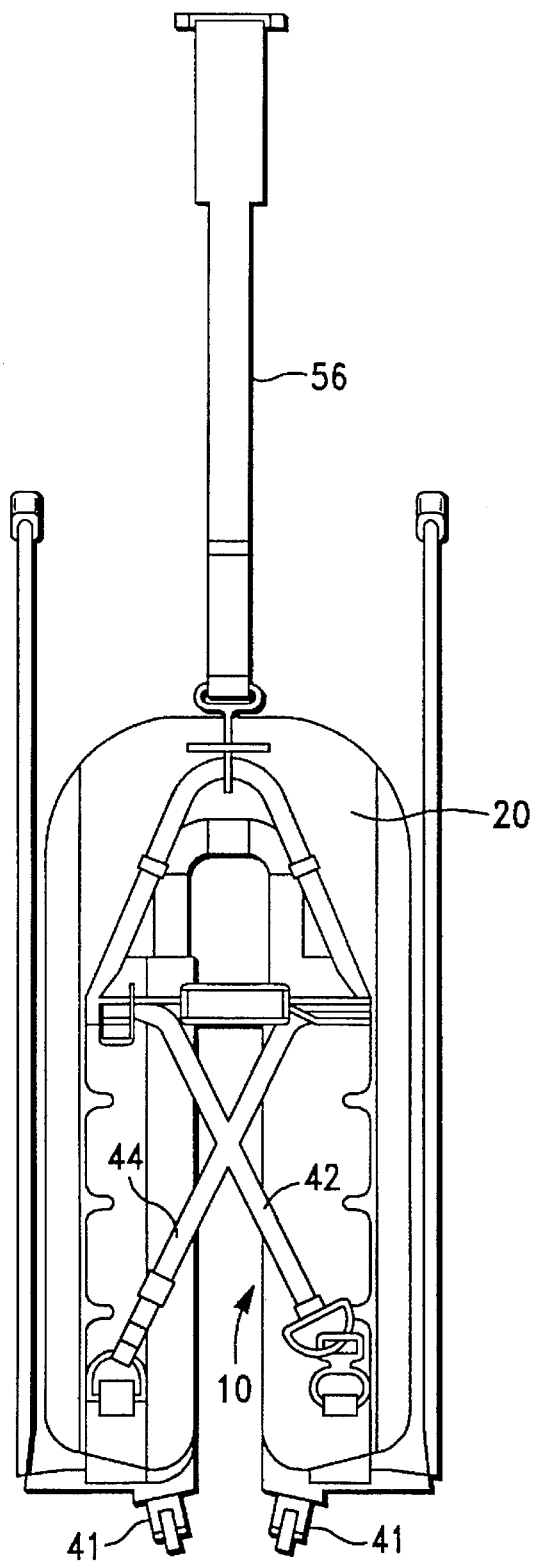
FIG. 2 is an end view of the garment bag luggage cart attachment combination of FIG. 1 in its closed configuration for carrying in a conventional manner by a shoulder strap.
Figure 3:
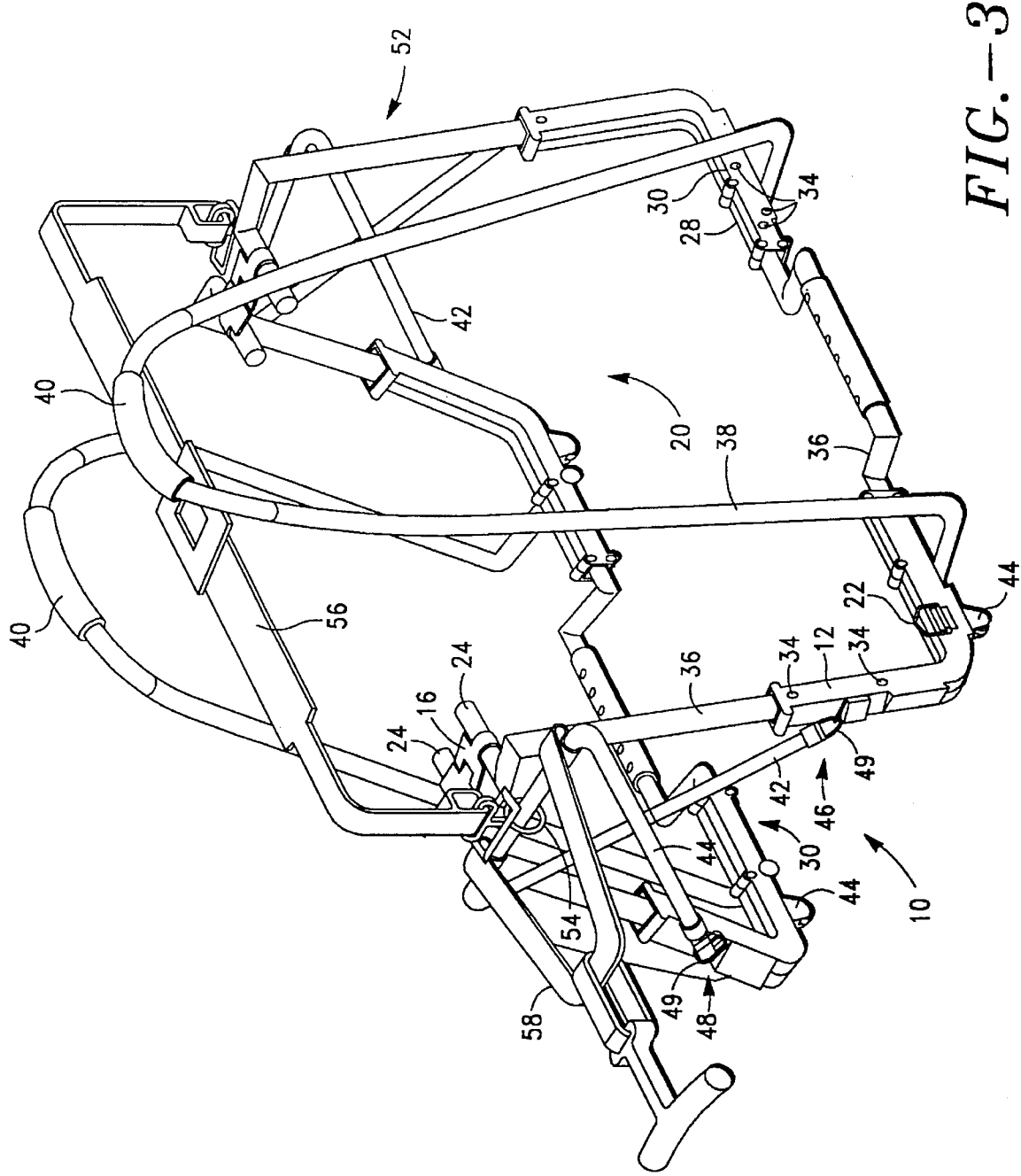
FIG. 3 is a perspective view of frame members used in the garment bag luggage cart attachment in the combination of FIGS. 1–2.

Turning now to the drawings, more particularly to FIGS. 1–3, there is shown a garment bag luggage cart attachment 10. The luggage cart 10 is formed from two mirror image frame members 12 and 14, which are pivotally connected at 16 and 18. A soft shell fabric garment bag 20 is fastened to the frame members 12 and 14 by fasteners 22. Opposing projections 24 extend into fold 26 of the garment bag 20 to help secure it in place on the frame members 12 and 14. There is an open space between the projections 24 so that the presence of the luggage cart 10 does not prevent the garment bag 20 from being deformed as often required to fit into an overhead luggage compartment in an aircraft passenger cabin.

The frame members 12 and 14 consist of L-shaped corner pieces 28, each of which is formed from halves 30 and 32, joined together with suitable fasteners at 34. The corner pieces 28 clamp around support rods 36. The upper support rods 36 terminate in the projections 24. Handle cables 38, desirably formed from Nylon or other somewhat flexible plastic extend from halves 32 of the corner pieces 28 and are partially enclosed in plastic sheaths 39 to give them sufficient rigidity to stand in the position shown without additional support. Handles 40 are provided at the top of handle rods 38 for carrying the luggage cart 10 and garment bag 20 when they are in the position shown in FIG. 2. Swivelable front wheels 41 and non-swivelable rear wheels 43 are provided on the bottom of the corner pieces 28 and are canted as shown in FIG. 2, so that the wheels 41 and 43 are vertically oriented when the luggage cart is in its open position of FIGS. 1 and 3.

A crossed flexible cable 42, also desirably formed from a flexible plastic, such as Nylon, is connected to the frame members 12 and 14 at 46 and 48 near the bottom of the frame members 12 and 14 by means of D-rings 49 and by means of tubes 51 near the top of the frame members 12 and 14 at front 50 and back 52 of the luggage cart 10. The cable 42 further is connected to a shoulder strap 56. A handle 58 is pivotally connected to the upper support rods 36.

In use of the luggage cart 10 and garment bag 20, the luggage cart 10 is opened from the position shown in FIG. 2 to the position shown in FIGS. 1 and 3 by placing the luggage cart 10 on the ground and pressing down on the top of the garment bag 20 or pulling up on the handles 40. Pressing down on the garment bag exerts a force having an outward component at the bottom of the frame members 12 and 14. When the handles 40 are pulled up, the bottoms of the frame members 12 and 14 tend to pivot outward. With the luggage cart in the position shown in FIGS. 1 and 3, the luggage cart can be wheeled around by pulling on the handle 58.

When it is desired to collapse the luggage cart 10, the user pulls up on the shoulder strap 56, which causes the crossed cable 42 to move in a manner similar to shoe laces to pull the frame members 12 and 14 toward one another at their bottom, making the frame members 12 and 14 substantially parallel to one another, as shown in FIG. 2. Friction between the cable 42 and the frame members 12 and 14 will tend to keep the frame members 12 and 14 in this orientation, but the shoulder strap 56 could also be shortened or a suitable fastener could be provided, either engaging the shoulder strap or fastening the frame members 12 and 14 together at their bottom, if desired. The garment bag 20 and luggage cart 10 are then in a suitable configuration to be carried, either by the shoulder strap 56 or the handles 40.

Figure 4:
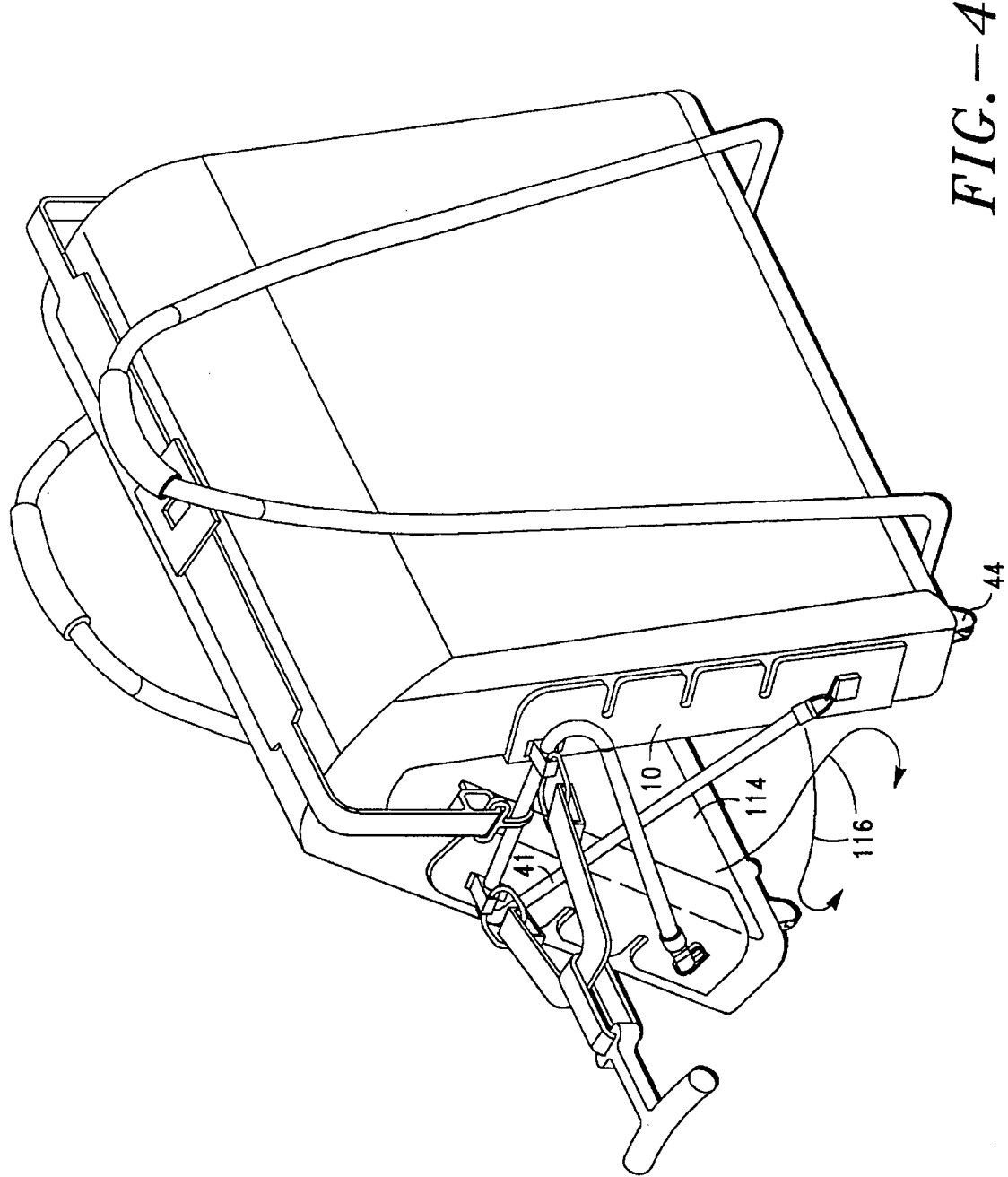
FIG. 4 is a perspective view of an integral garment bag luggage cart combination in accordance with the invention in its standing configuration for use as a luggage cart.
Figure 5:
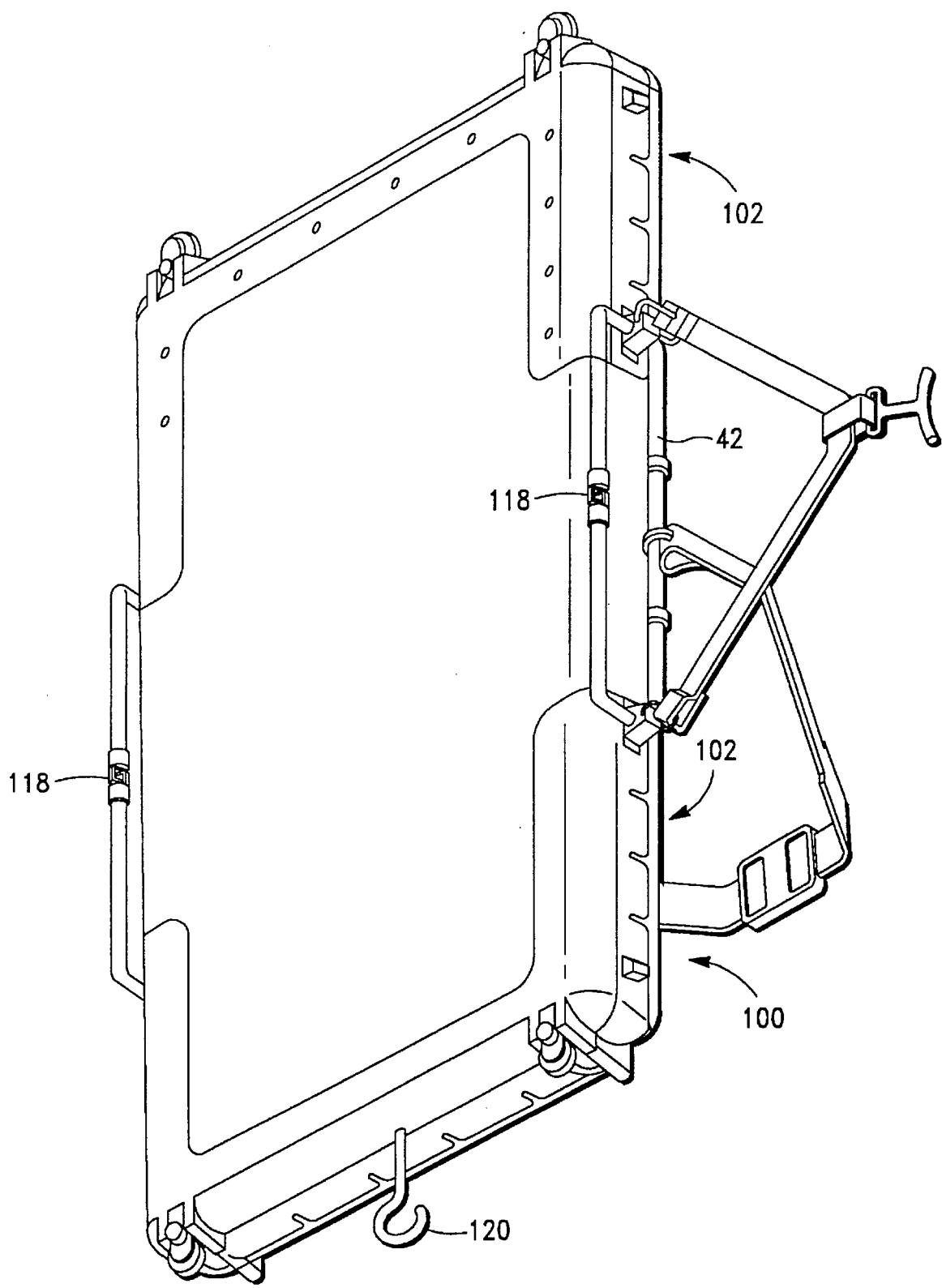
FIG. 5 is a perspective view of the integral garment bag luggage cart combination of FIGS. 4 in a flat configuration for hanging in a closet and/or for packing and unpacking.

FIGS. 4 and 5 show a similar combination of a garment bag 100 and structure 102 that provides the function of an A-frame configuration luggage cart for the garment bag 100. The FIGS. 4 and 5 embodiment differs from the FIGS. 1–3 embodiment in that frame members 112 and 114 are permanently attached to the garment bag 100. Other than as shown and described, the construction and operation of the FIGS. 4 and 5 embodiment of the invention is the same as that of the FIGS. 1–3 embodiment.

In order to flatten the garment bag 100 and luggage cart structure 102 to the configuration shown in FIG. 5, for example, in order to hang the garment bag 100 in a closet, the crossed cables 42 are unhooked as indicated by arrows 116 in FIG. 4 and hooked together to form a loop as shown at 118 in FIG. 5. The garment bag 100 can then be hung by hook 120 in a conventional manner.

Figure 6:
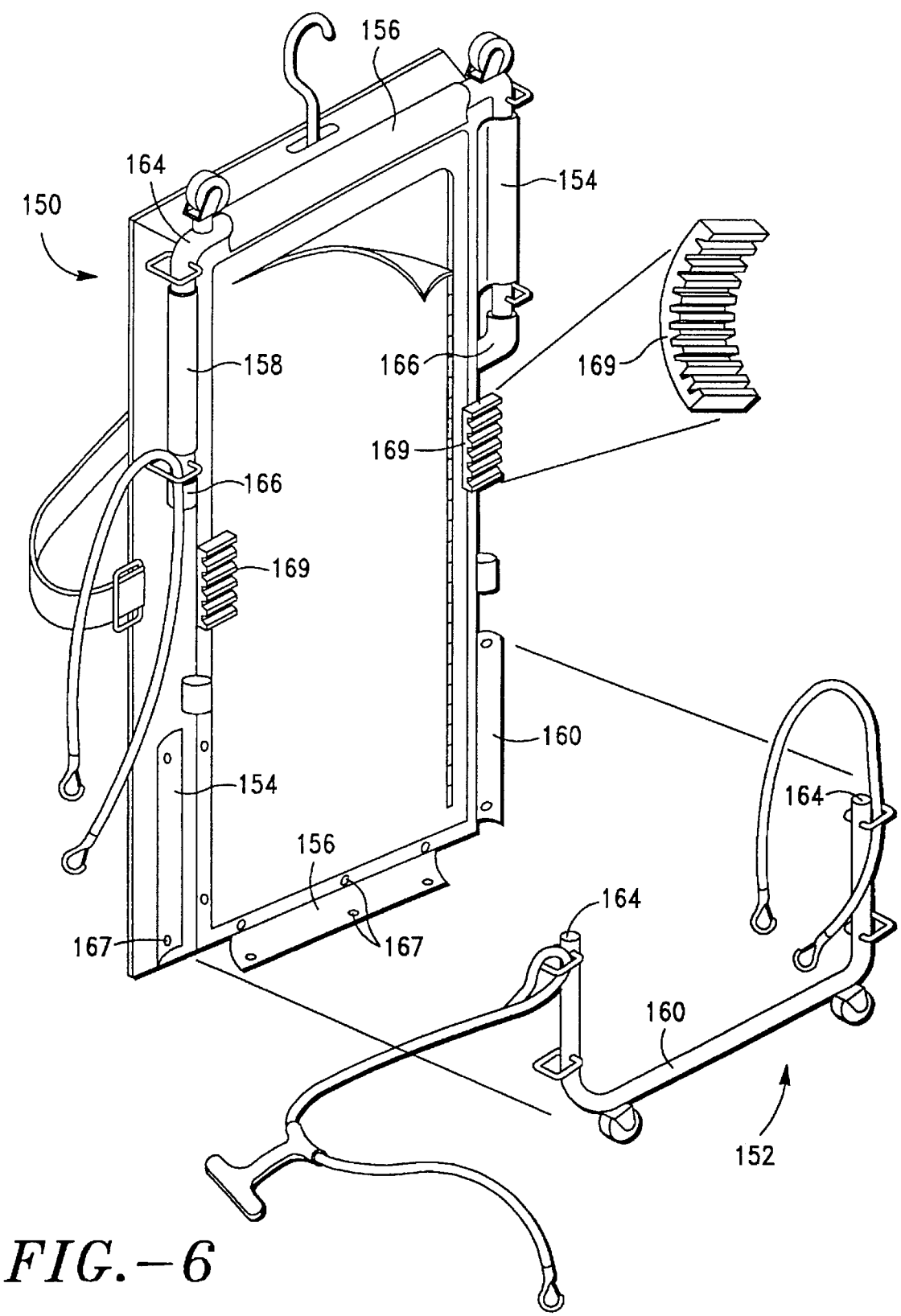
FIG. 6 is an exploded perspective view of an integrated garment bag and luggage cart attachment for use with the garment bag.
Figure 7:
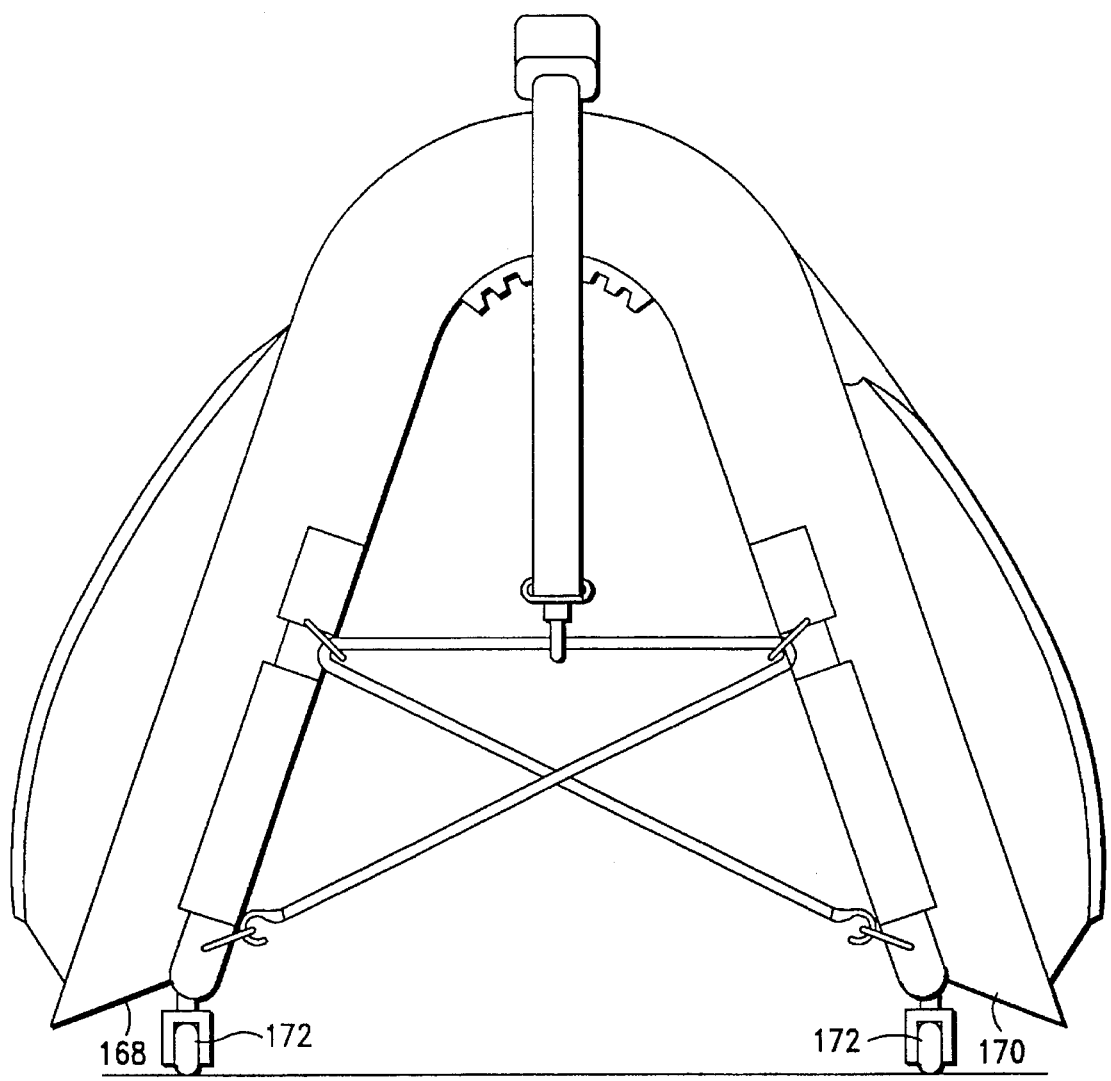
FIGS. 7 and 8 are end views of the integrated garment bag and luggage cart attachment for use with the garment bag of FIG. 6 in two different configurations during their use.
Figure 8:
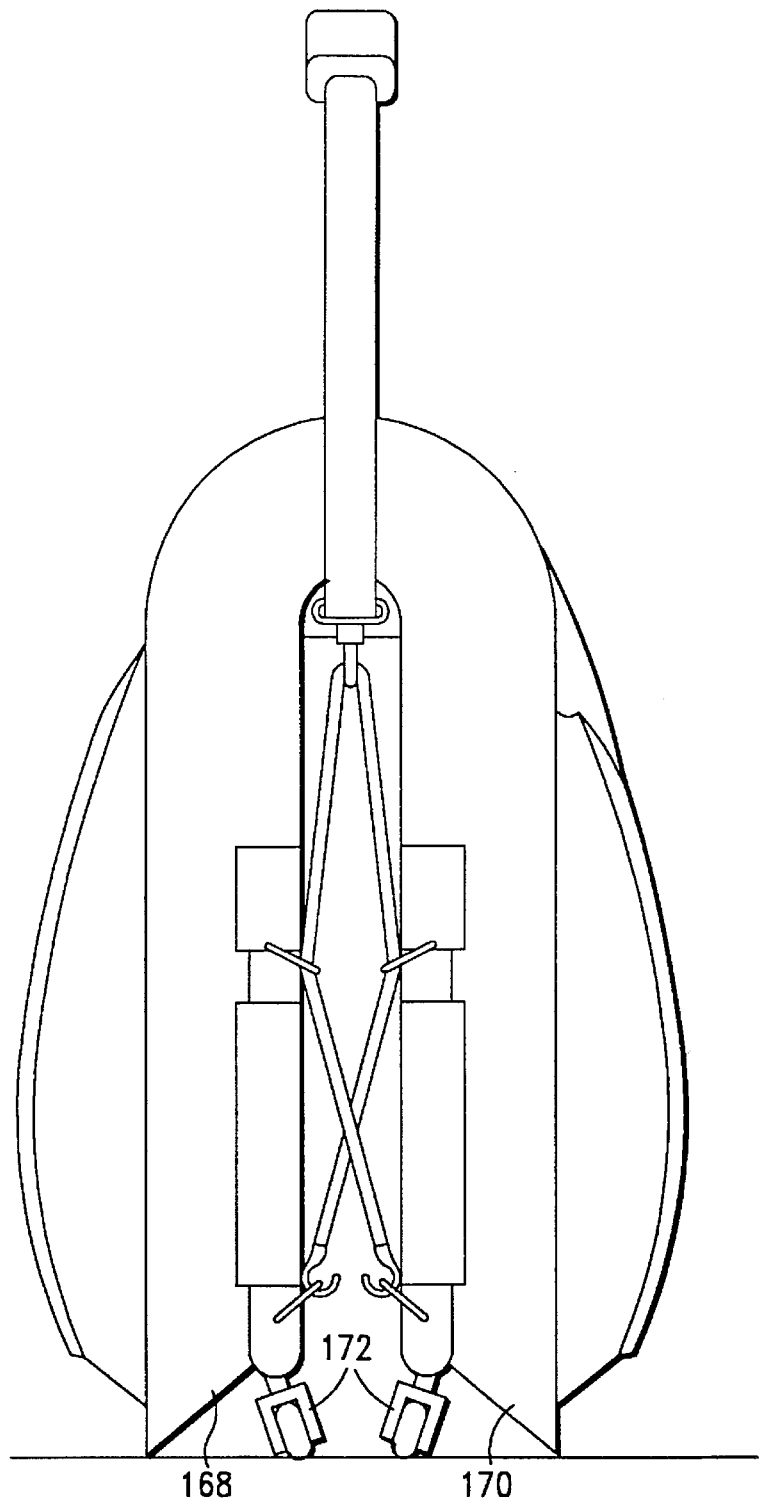

FIGS. 6–8 show an integrated garment bag 150 and luggage cart structure 152, with the garment bag 150 being designed specifically to receive the luggage cart structure 152 and so that the luggage cart structure 152 is removable. The garment bag 150 has two sets of flaps 154, 156 and 158 that fit over frame members 160 and 162, with ends 164 of the frame members inserted in covering pockets 166 to hold the frame members 160 and 162 securely in place. The flaps 154, 156 and 158 are held in place over the frame members 160 and 162 by means of snaps 167, Velcro strips or other suitable fasteners. Rubber or other suitable elastomeric material hinges 169 on the garment bag 150 tend to flatten and therefore urge the sides of the garment bag apart to the configuration shown in FIG. 7 when the garment bag is placed on the ground or other supporting surface. This feature is an aid to placing the garment bag in this configuration for pulling behind the user.

FIGS. 7 and 8 show that ends 168 and 170 of the garment bag 152 are angled, so that wheels 172 do not protrude when the garment bag is in the configuration shown in FIG. 8 for stowing in an aircraft passenger compartment overhead bin or other confined storage space. When it is desired to use the garment bag 150 in a conventional manner, without the luggage cart structure 152, the frame members 160 and 162 are removed from the flaps 154, 156 and 158. Other than as shown and described, the construction and operation of the FIGS. 6–8 embodiment of the invention is the same as that of the FIGS. 1–5 embodiments.

It should now be readily apparent to those skilled in the an that a novel luggage cart for a garment bag capable of achieving the stated objects of the invention has been provided. The garment bag includes the function of a luggage cart in an improved manner. Structural members for providing the luggage cart function are integrated with a garment bag that is designed to receive them. The integrated luggage cart and garment bag easily changes shape between a luggage cart configuration and a form for carrying in a conventional manner as a garment bag. The luggage cart and garment bag combination easily changes shape between a luggage cart configuration and a form for carrying in a conventional manner as a garment bag. The luggage cart and garment bag combination changes shape easily to a fully opened configuration for hanging. The luggage cart and garment bag combination in which the above easy ability to change configuration is provided in an integral construction with the garment bag, as an attachment for use with preexisting garment bags, or as an attachment for a garment bag that is specifically designed to be used with the attachment.

It should further be apparent to those skilled in the art that various changes in form and details of the invention as shown and described may be made. It is intended that such changes be included within the spirit and scope of the claims appended hereto.

What is claimed is:

1. A luggage cart comprising:

a first frame member and a second frame member, the frame members being pivotally joined to pivot between an open configuration and a collapsed configuration, each frame member having a bottom;

a crossed cable attached between the frame members;

a shoulder strap attached to the crossed cable to selectively pivot the frame members from the open configuration to the collapsed configuration;

handle rods extending from each frame member, the handle rods have ends which attach to the frame member bottoms; and a handle attached to each handle rod for selectively pivoting the frame members from the collapsed configuration to the open configuration, whereby, the handle pivots the frame members from the collapsed configuration to the open configuration.

2. The luggage cart as set forth in claim 1, wherein a garment bag attaches to the frame members.

3. A luggage cart comprising:

a first frame member and a second frame member, the frame members being pivotally joined to pivot between an open configuration to a collapsed configuration a crossed cable attached between the frame members;

a shoulder strap attached to the crossed cable to selectively pivot the frame members from the open configuration to the collapsed configuration;

handle rods extending from each of the frame members, the handle rods have two ends which attach to the frame members; and a handle attached to each handle rod between the ends to selectively pivot the frame members from the collapsed configuration to the open configuration, whereby, the handle pivots the frame members from the collapsed configuration to the open configuration.

* * * * *